(12) United States Patent
Lee

(10) Patent No.: US 11,477,195 B2
(45) Date of Patent: Oct. 18, 2022

(54) NETWORK CONNECTION MANAGING SYSTEM

(71) Applicant: UPAS CORPORATION, Taipei (TW)

(72) Inventor: Kun-Jung Lee, Taipei (TW)

(73) Assignee: UPAS CORPORATION, Taipei (TW)

( * ) Notice: Subject to any disclaimer, the term of this patent is extended or adjusted under 35 U.S.C. 154(b) by 154 days.

(21) Appl. No.: 17/077,832

(22) Filed: Oct. 22, 2020

(65) Prior Publication Data

US 2021/0377266 A1 Dec. 2, 2021

(30) Foreign Application Priority Data

Jun. 1, 2020 (TW) .................................. 109118246

(51) Int. Cl.
*H04L 29/00* (2006.01)
*H04L 9/40* (2022.01)
*H04L 101/622* (2022.01)

(52) U.S. Cl.
CPC .......... *H04L 63/0876* (2013.01); *H04L 63/10* (2013.01); *H04L 63/1433* (2013.01); *H04L 2101/622* (2022.05)

(58) Field of Classification Search
CPC . H04L 63/0876; H04L 63/10; H04L 63/1433; H04L 2101/622; H04L 63/102; H04L 63/1408
See application file for complete search history.

(56) References Cited

U.S. PATENT DOCUMENTS

| 9,338,181 | B1* | 5/2016 | Burns | H04L 63/1433 |
| 9,351,166 | B2* | 5/2016 | Han | H04W 12/12 |
| 10,080,047 | B1* | 9/2018 | Lonstein | H04W 4/12 |
| 10,354,338 | B2* | 7/2019 | Co | G06Q 50/01 |
| 11,057,769 | B2* | 7/2021 | Vanchev | H04L 63/1416 |
| 2003/0217289 | A1* | 11/2003 | Ammon | H04L 63/18 726/23 |
| 2003/0233567 | A1* | 12/2003 | Lynn | H04W 12/122 726/23 |
| 2003/0236990 | A1* | 12/2003 | Hrastar | H04L 63/102 726/11 |
| 2004/0098610 | A1* | 5/2004 | Hrastar | H04L 63/1408 726/1 |
| 2004/0209634 | A1* | 10/2004 | Hrastar | H04W 12/088 455/515 |

(Continued)

FOREIGN PATENT DOCUMENTS

CN 109120599 A * 1/2019

*Primary Examiner* — Don G Zhao
(74) *Attorney, Agent, or Firm* — Lathrop GPM LLP

(57) ABSTRACT

The present invention discloses a network connection managing system comprising one or more information devices, a network node data verifying device and a network node connection managing device. The information device is a network node installed with a mobile network card such that a MAC address of the mobile network card and network node identifying data of the network node are transmitted to the network node data verification device by a data reporting software, and are then compared by the network node data verifying device. The network node connection managing device is connected to the network node data verifying device and blocks a network connection for the network node according to a comparison result.

7 Claims, 6 Drawing Sheets

(56) References Cited

U.S. PATENT DOCUMENTS

| | | | | |
|---|---|---|---|---|
| 2005/0044418 A1* | 2/2005 | Miliefsky | ............ | H04L 63/0272 |
| | | | | 726/4 |
| 2006/0085543 A1* | 4/2006 | Hrastar | ............... | H04W 12/122 |
| | | | | 709/224 |
| 2006/0123133 A1* | 6/2006 | Hrastar | ............... | H04L 63/1491 |
| | | | | 709/240 |
| 2014/0150049 A1* | 5/2014 | Kwon | ..................... | H04W 4/50 |
| | | | | 726/1 |
| 2014/0150069 A1* | 5/2014 | Lee | ...................... | H04L 63/101 |
| | | | | 726/4 |
| 2014/0173700 A1* | 6/2014 | Awan | .................... | H04L 63/101 |
| | | | | 726/4 |
| 2015/0223068 A1* | 8/2015 | Thelen | ................. | H04W 12/069 |
| | | | | 726/7 |
| 2016/0050559 A1* | 2/2016 | Rose | ................. | H04L 2101/622 |
| | | | | 370/338 |
| 2016/0080375 A1* | 3/2016 | Heidt | .................. | H04L 63/0823 |
| | | | | 713/171 |
| 2017/0094515 A1* | 3/2017 | Salo | ....................... | H04L 63/102 |
| 2017/0238235 A1* | 8/2017 | Keidar | ................ | H04L 63/0876 |
| | | | | 370/338 |
| 2017/0238236 A1* | 8/2017 | Miller | ................... | H04W 12/06 |
| | | | | 370/338 |
| 2017/0332307 A1* | 11/2017 | Pan | ....................... | H04W 48/16 |
| 2018/0091974 A1* | 3/2018 | Dickens | ................. | G06Q 50/12 |

* cited by examiner

NETWORK CONNECTION MANAGING SYSTEM

FIELD OF THE INVENTION

The present invention relates to an information system, and more particularly relates to a network connection managing system.

BACKGROUND OF THE INVENTION

A conventional network connection managing system generally achieves network connection management by identifying a network node's IP address (Internet Protocol Address) or MAC address (Media Access Control Address) to determine a network access right for the network node. The network node is referred to an information device to be connected to the network, such as a personal computer, a notebook computer, etc.

On the other hand, with the development of network technology, a USB network card having hot plugging function has been more and more popular. On the premise that the MAC address of the USB network card has been identified or authenticated by the network connection managing system, a user can carry and plug the USB network card into any information device to establish a network connection. Therefore, under a management of the network connection managing system, the user can obtain a maximized freedom for the network connection and an operation convenience for the information device as well.

However, in the case that the USB network card authenticated by the network connection managing system is unplugged from one information device to plug into another information device restrained, e.g., an information device which stores important information but is not allowable to connect to the network according to information managing policies, it will cause the restrained information device to easily obtain the authority from the network connection managing system such that the loopholes on the information security protection is caused. In other case, it may happen that some users fraudulently use the MAC address of the USB network card which has been authenticated by the network connection managing system to result in other unrestrained information devices obtaining the authority of the network connection managing system to connect to the network. Therefore, the defect on the network connection management is formed.

SUMMARY OF THE INVENTION

Therefore, one objective of the present invention is to provide a network connection managing system which ensure a mobile network card (such as a USB network card) authenticated by a network connection managing system to be restricted used by the same information device, thereby preventing the mobile network card to be unplugged from one information device to plug into another information device. Moreover, the present invention can further prevent the MAC address of the mobile network card from being fraudulently used. Therefore other information devices cannot be connected to the network in an unrestrained manner.

In order to achieve the above objective, the present invention provides a network connection managing system, comprising: one or more information devices, each of which is a network node, each network node being installed with a data reporting software including agent data reporting software and/or WMI data reporting software, wherein the agent data reporting software reports information relating to the network node no matter whether the network node is installed with a Windows operating system or not, the WMI data reporting software reports, when the network node is connected to a network and is installed with the Windows operating system, information relating to the network node, each network node is installed with a mobile network card such that the data reporting software transmits a MAC address of the mobile network card and network node identifying data of the network node to a network node data verification device, the MAC address and the network node identifying data obtained by the agent data reporting software is assigned with a data reliability degree higher than that of the MAC address and the network node identifying data obtained by the WMI data reporting software; the network node data verifying device having a list managing unit, the network node data verifying device being in signal-connection with the mobile network card to receive, from the data reporting software of the network node, the MAC address and the network node identifying data obtained by the data reporting software of the network node, and/or the network node data verifying device being configured to use a Nmap network security scanning software to scan the network node such that the network node identifying data and the MAC address of the network node are obtained, thereby recording the initially obtained network node identifying data and the MAC address into an information device list, wherein the Nmap network security scanning software is a network security scan tool used for scanning network and exploring network hosts, the MAC address and the network node identifying data which are obtained by the WMI data reporting software is assigned with a data reliability degree higher than that of the MAC address and the network node identifying data which are obtained by the Nmap network security scanning software, the list managing unit is operated to replace the MAC address and the network node identifying data having lower data reliability degree with the MAC address and the network node identifying data having higher data reliability degree, and the network node data verifying device compares a currently received MAC address and currently received network node identifying data with the MAC address and the network node identifying data in the information device list to generate a comparison result; and a network node connection managing device, connected to the network node data verifying device, wherein according to the comparison result, the network node connection managing device blocks a network connection for the network node when the comparison result indicates a mismatching result, the MAC address and the network node identifying data are with one-to-one-relationship status in the information device list to prevent a network connection for the network node that fraudulently uses the MAC address to request the network connection, and the network node connection managing device allows the network connection for the network node when the comparison result is a matching result.

In one embodiment of the present invention, the network connection managing system is provided, wherein during the process that the list managing unit collects the MAC address of the information device and the network node identifying data by replacing the MAC address and the network node identifying data having the lower data reliability degree with the MAC address and the network node identifying data having the higher data reliability degree, the agent data reporting software or the WMI data reporting software continues querying the network node, or the Nmap network security scanning software continues scanning the network node to obtain the MAC address and the network node identifying data, and during the process that the network node data verifying device compares the currently received MAC address and the currently received network node identifying data with the MAC address and the network node identifying data in the information device list to verify the MAC address of the information device and the network node identifying data, when the agent data reporting software has obtained the MAC address and the network node identifying data, the WMI data reporting software skips the operation of querying the MAC address and the network node identifying data, and when the WMI data reporting software has obtained the MAC address and the network node identifying data, the Nmap network security scanning software skips the operation of scanning the network node.

In one embodiment of the present invention, the network connection managing system further comprises a list confirming device, wherein the list confirming device is connected to one or more information devices and the network node data verifying device, the list confirming device confirms whether the currently received MAC address and the currently received network node identifying data have been recorded in the information device list or not by comparing the currently received MAC address to be verified and the currently received network node identifying data to be verified with the MAC address and the network node identifying data in the information device list such that when it is confirmed that the currently received MAC address and the currently received network node identifying data have not been recorded into the information device list, the currently received MAC address and the currently received network node identifying data are transmitted to the list managing unit of the network node data verifying device so as to record the initially obtained MAC address and the network node identifying data into the information device list.

In one embodiment of the present invention, the network connection managing system further comprises a list inspecting device, connected between the list confirming device and the network node data verifying device, wherein when the list inspecting device receives, from the list confirming device, a massage indicating the current received MAC address and the current received network node identifying data having been recorded into the information device list, the list inspecting device further inspects, from the list managing unit of the network node data verifying device, whether the current received MAC address and the current received network node identifying data in the information device list are in a one-to-one-relationship-not-yet-determined status, and when the network connection managing system confirms that the MAC address and the network node identifying data in the information device list are in a one-to-one-relationship-not-yet-determined status, the MAC address and the network node identifying data in the information device list are to be configured to be any one of the following statuses including in the information device list: a one-to-one-relationship status, a one-to-one-relationship-unnecessary status, and the one-to-one-relationship-not-yet-determined status.

In one embodiment of the present invention, the network connection managing system further comprises a list examining device, connected between the list inspecting device and the network node data verifying device, wherein when the list examining device have received, from the list inspecting device, a massage indicating that the MAC address and the network node identifying data in the information device list are not in the one-to-one-relationship-not-yet-determined status, the list examining device further enables the list managing unit of the network node data verifying device to confirm whether the MAC address and the network node identifying data in the information device list are configured to be the one-to-one-relationship-unnecessary status, when the network connection managing system confirms that the MAC address and the network node identifying data in the information device list are in the one-to-one-relationship-unnecessary status, the list examining device transmits the current received MAC address and the current received network node identifying data to the network node data verifying device such that the network node data verifying device abandons the current received MAC address and the current received network node identifying data, or terminates the operation of comparing data including the current received MAC address and the current received network node identifying data with data including the MAC address and the network node identifying data in the information device list, and when the network connection managing system confirms that the MAC address and the network node identifying data in the information device list are not in the one-to-one-relationship-unnecessary status, the list examining device transmits the current received MAC address and the current received network node identifying data to the network node data verifying device so as to perform the operation of comparing data including the current received MAC address and the current received network node identifying data with data including the MAC address and the network node identifying data in the information device list.

In one embodiment of the present invention, the network connection managing system is provided, wherein the network node identifying data includes: a computer name and/or a hardware fingerprint value, and the hardware fingerprint value is generated by hashing a UUID code of the information device, when a computer name in the current received network node identifying data is different from the computer name in the network node identifying data in the information device list, the network node data verifying device generates the comparison result indicating that the computer name is not matched, when a hardware fingerprint value in the current received network node identifying data is different from the hardware fingerprint value in the network node identifying data in the information device list, the network node data verifying device generates the comparison result indicating that the hardware fingerprint value is not matched, and when both the computer name and the hardware fingerprint value in the current received network node identifying data are different from the computer name and the hardware fingerprint value in the network node identifying data in the information device list, the network node data verifying device generates the comparison result indicating that both the computer name and the hardware fingerprint value are not matched.

In one embodiment of the present invention, the network connection managing system is provided, wherein when the data reporting software fails to obtain the MAC address and the network node identifying data to cause the MAC address and the network node identifying data unable to be transmitted to the network node data verifying device to the network node data verifying device, the network node data verifying device generates a comparison result indicating that the one-to-one-relationship status between the MAC address and the network node identifying data is unable to be verified such that the network connection for the network node is blocked.

The network connection managing system of the present invention has the technical effects as follows. The mobile network card and the information device are with one-to-one-relationship status, thereby preventing from the mobile network card being unplugged from one information device and then plugged into another information device. Furthermore, the present invention prevents the MAC address of the mobile network card to be fraudulently used so as to prevent someone who intends to evade control of the network connection managing system from connecting other unrestrained information device to the network by the fraudulently used MAC address.

DETAILED DESCRIPTION OF THE PREFERRED EMBODIMENTS

The preferred embodiments of the present invention are described in detail with reference to FIGS. 1 to 6. The description is used for explaining the embodiments of the present invention only, but not for limiting the scope of the claims.

Figure 1:
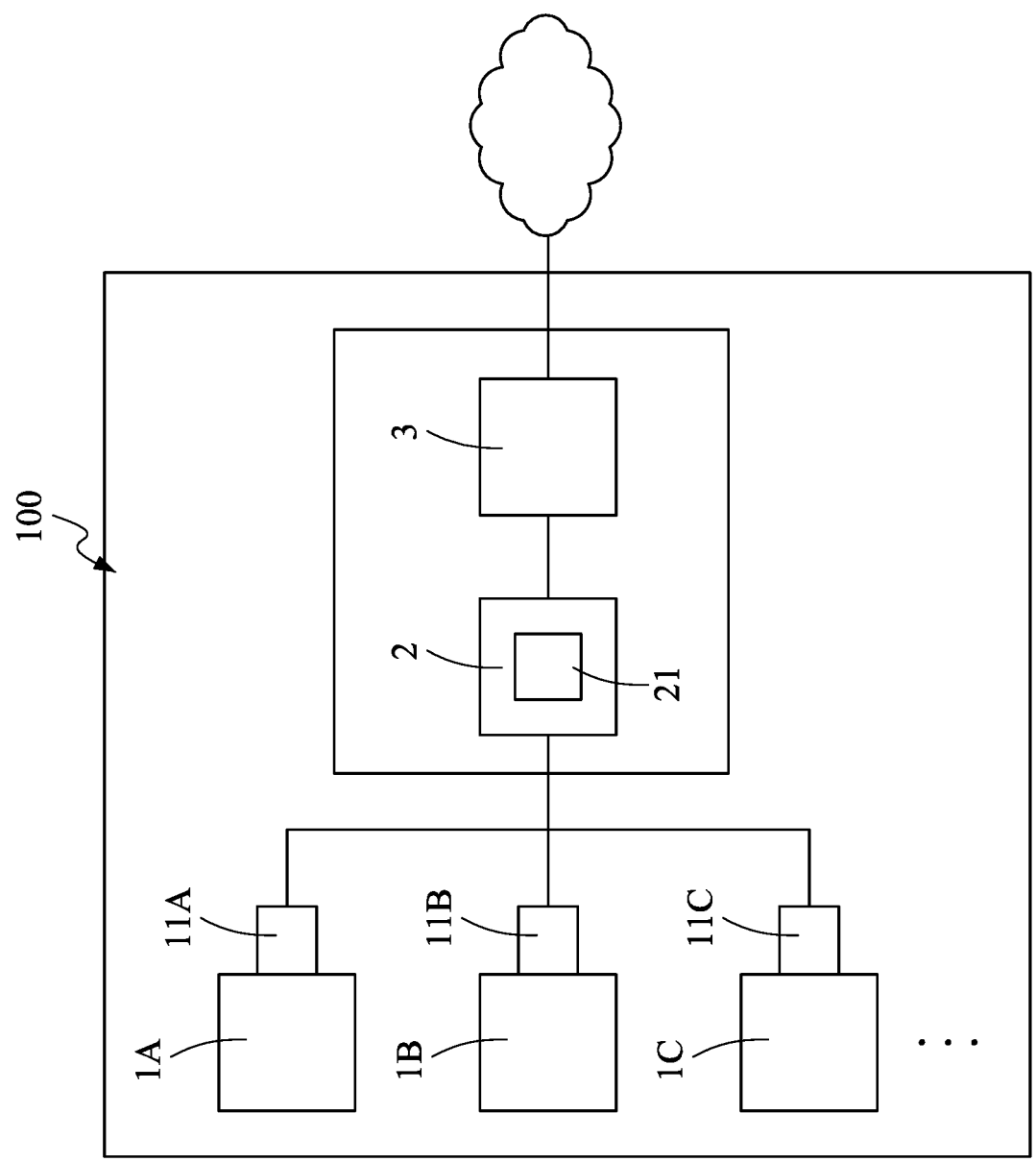
FIG. 1 is a schematic block structure diagram illustrating a network connection managing system for one or more information devices according to first embodiment of the present invention.

As shown in FIG. 1, a network connection managing system 100 according to first embodiment of the present invention comprises: one or more information devices (1A, 1B, 1C) a network node data verifying device 2, and a network node connection managing device 3. Therefore, the present invention ensures that a mobile network card which has been identified and has been authenticated by the network connection managing system 100 is restrained to be used by the same information device (1A, 1B, 1C), thereby preventing from the mobile network card to be unplugged from one information device (1A, 1B, 1C) and plugged into another information device. Moreover, the present invention can further prevent the MAC address of the mobile network card from being fraudulently used. Accordingly, other information devices cannot be connected to the network in an unrestrained condition.

Furthermore, each of the information devices (1A, 1B, 1C) is a network node, and each network node is installed with data reporting software including agent data reporting software and/or WMI (Windows Management Instrumentation) data reporting software. In detail, when the network node is connected to a network and is installed with the Windows operating system, the WMI data reporting software reports information relating to the network node. Moreover, the agent data reporting software is a software developed, by the applicant, to be applied to the computer terminal, and the agent data reporting software reports information relating to the network node no matter whether the network node is installed with a Windows operating system or not.

Moreover, as shown in FIG. 1, each network node, i.e., the information device (1A, 1B, 1C), is installed with a mobile network card (11A, 11B, 11C), i.e., a USB network card, such that the data reporting software transmits a MAC address of the mobile network card and network node identifying data of the network node to the network node data verification device 2. Specifically, according to predetermined configuration, the MAC address and the network node identifying data obtained by the agent data reporting software are assigned with a data reliability degree higher than that of the MAC address and the network node identifying data obtained by the WMI data reporting software.

As shown in FIG. 1, the network node data verifying device 2 has a list managing unit 21. The network node data verifying device 2 is in signal-connection with the mobile network card to receive, from the data reporting software of the network node, the MAC address and the network node identifying data which are obtained by the data reporting software of the network node, and record the initially obtained network node identifying data and the MAC address into an information device list. Specifically, the list managing unit 21 searches the MAC address of the network node which is recorded into the information device list according to the MAC address to determine whether the MAC address of the information device, i.e., the network node (1A, 1B, 1C), and the network node identifying data are initially obtained or not.

Moreover, as shown in FIG. 1, the network node data verifying device 2 may be further configured to use a Nmap (Network Mapper) network security scanning software to scan the network node such that the network node identifying data and the MAC address of the network node are obtained. Then, the initially obtained network node identifying data and the MAC address are recorded into the information device list, wherein the Nmap network security scanning software is a network security scan tool used for scanning network and exploring network hosts so as to assist the network node data verifying device 2 to obtain information of the network node. Furthermore, according to predetermined configuration, the MAC address and the network node identifying data which are obtained by the WMI data reporting software are assigned with a data reliability degree higher than that of the MAC address and the network node identifying data which are obtained by the Nmap network security scanning software.

As shown in FIG. 1, during the process that the present invention collects the MAC address of the information device (1A, 1B, 1C) and the network node identifying data, the list managing unit 21 is operated to replace the MAC address and the network node identifying data having lower data reliability degree with the MAC address and the network node identifying data having higher data reliability degree so as to update the information of the information device (1A, 1B, 1C), wherein the information of the information device is recorded in the information device list. Specifically, the agent data reporting software or the WMI data reporting software continues querying the MAC address of the network node and the network node identifying data, and/or the Nmap network security scanning software continues scanning the network node so as to obtain the MAC address of the network node and the network node identifying data.

Moreover, during the process that the present invention verifies the MAC address of the information device (1A, 1B, 1C) and the network node identifying data, the network node data verifying device 2 compares a currently received MAC address and currently received network node identifying data with the MAC address and the network node identifying data in the information device list to generate a comparison result. Furthermore, because of "the agent data reporting software being assigned with the data reliability degree higher than that of the WMI data reporting software", when the agent data reporting software has obtained the MAC address and the network node identifying data, the WMI data reporting software skips the operation of querying the MAC address and the network node identifying data. In other case, because of "the WMI data reporting software being assigned with the data reliability degree higher than that of the Nmap network security scanning software", when the WMI data reporting software has obtained the MAC address and the network node identifying data, the Nmap network security scanning software skips the operation of scanning the network node.

As shown in FIG. 1, the network node connection managing device 3 is connected to the network node data verifying device 2. When the comparison result indicates a mismatching result, the network node connection managing device 3 blocks a network connection for the network node, such as the information device (1A, 1B, 1C), according to the comparison result. Moreover, the MAC address and the network node identifying data are with one-to-one-relationship status in the information device list to prevent from a network connection that the network node fraudulently uses the MAC address to request the network connection. In other case, the network node connection managing device 3 allows the network connection for the network node when the comparison result is a matching result.

Furthermore, in one embodiment of the present invention, the network node data verifying device 2 and the network node connection managing device 3 can be mounted into the same equipment. For example, the network node data verifying device 2 and the network node connection managing device 3 are mounted into one equipment case. However, the present invention is not limited to this. Depending on the mounting requirement for the system, the network node data verifying device 2 and the network node connection managing device 3 can also be individually mounted into the different equipment.

Figure 2:
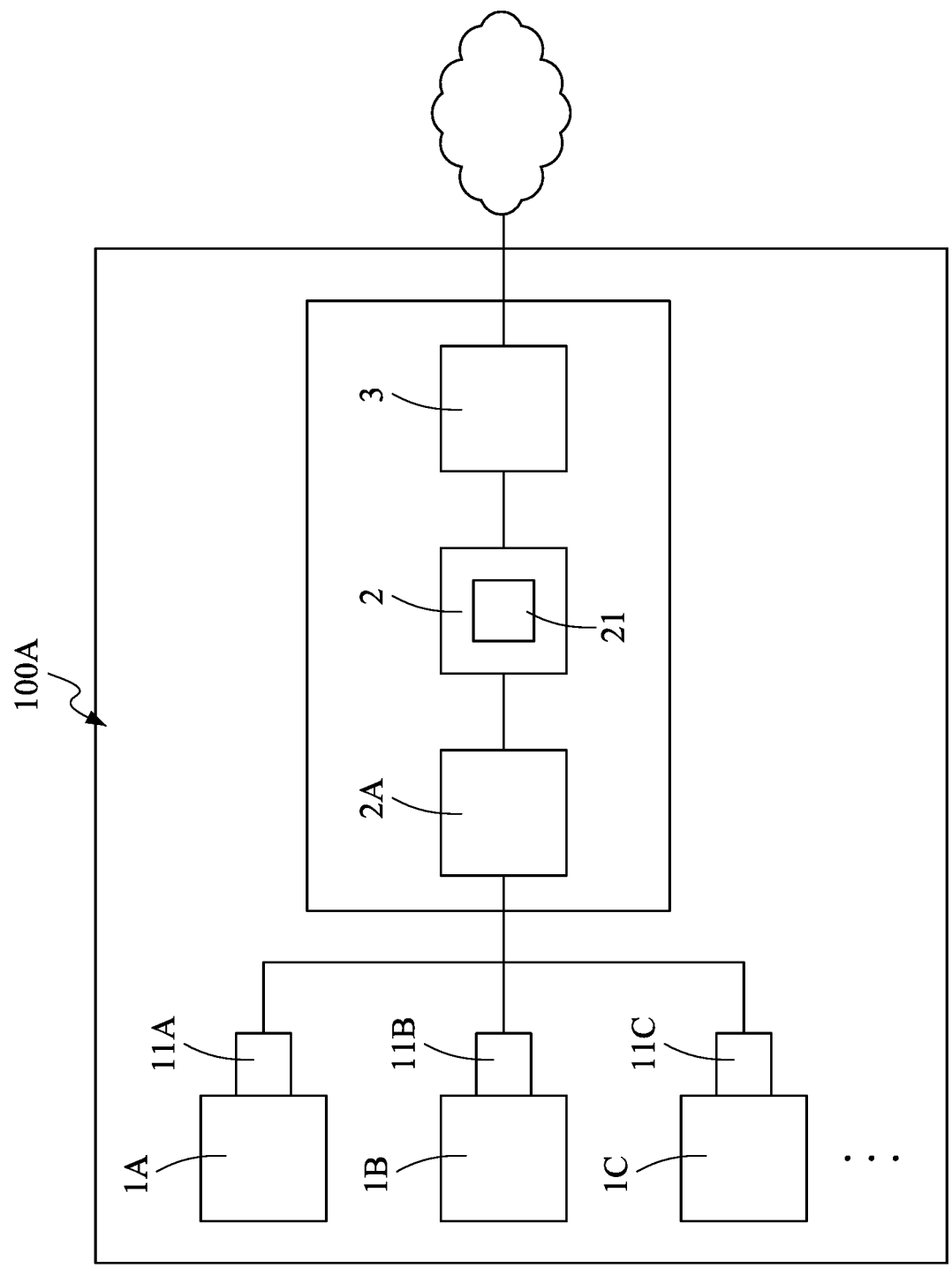
FIG. 2 is a schematic block structure diagram illustrating a network connection managing system for one or more information devices according to second embodiment of the present invention.

As shown in FIG. 2, a difference between a network connection managing system 100A according to second embodiment of the present invention and the network connection managing system 100 is that, under the technology of the network connection managing system 100, the network connection managing system 100A further comprises a list confirming device 2A. The list confirming device 2A is connected to one or more information devices (1A, 1B, 1C) and the network node data verifying device 2. The list confirming device 2A confirms whether the currently received MAC address and the currently received network node identifying data have been recorded in the information device list or not by comparing the currently received MAC address to be verified and the currently received network node identifying data to be verified with the MAC address and the network node identifying data in the information device list. When it is confirmed that the currently received MAC address and the currently received network node identifying data have not been recorded into the information device list, the currently received MAC address and the currently received network node identifying data are transmitted to the list managing unit 21 of the network node data verifying device 2 by the list confirming device 2A so as to record the initially obtained MAC address and the network node identifying data into the information device list.

Figure 3:
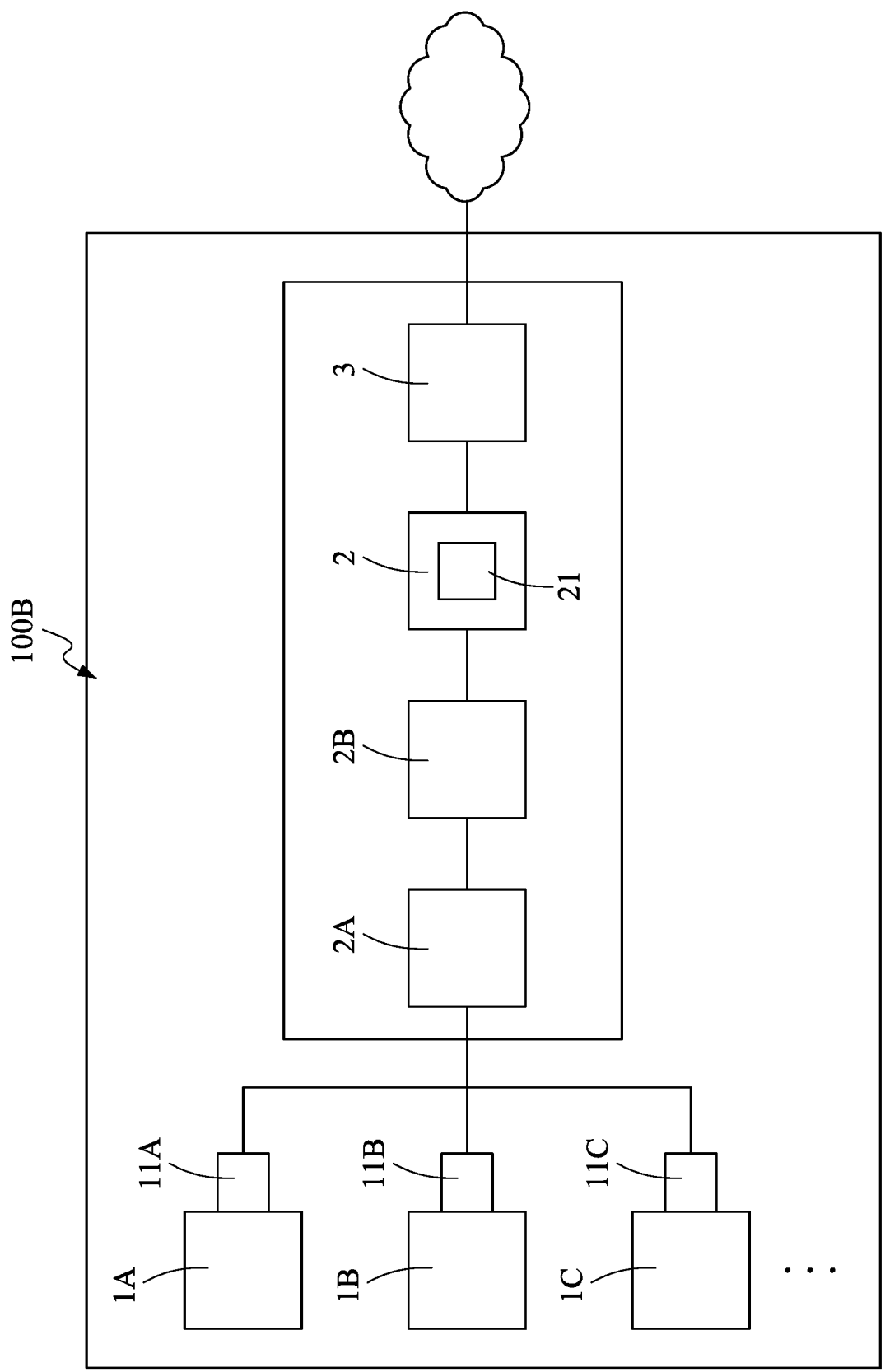
FIG. 3 is a schematic block structure diagram illustrating a network connection managing system for one or more information devices according to third embodiment of the present invention.

As shown in FIG. 3, a difference between a network connection managing system 100B according to third embodiment of the present invention and the network connection managing system 100A is that, under the technology of the network connection managing system 100A, the network connection managing system 100B further comprises a list inspecting device 2B. The list inspecting device 2B is connected between the list confirming device 2A and the network node data verifying device 2. When the list inspecting device 2B receives, from the list confirming device 2A, a massage indicating the current received MAC address and the current received network node identifying data having been recorded into the information device list, the list inspecting device 2B further determines, from the list managing unit 21 of the network node data verifying device 2, whether the current received MAC address and the current received network node identifying data in the information device list are in a one-to-one-relationship-not-yet-determined status or not. When the network connection managing system confirms that the MAC address and the network node identifying data in the information device list are in a one-to-one-relationship-not-yet-determined status by the list inspecting device 2B, the MAC address and the network node identifying data in the information device list are to be configured to be any one of the following statuses including in the information device list: a one-to-one-relationship status, a one-to-one-relationship-unnecessary status, and the one-to-one-relationship-not-yet-determined status.

Figure 4:
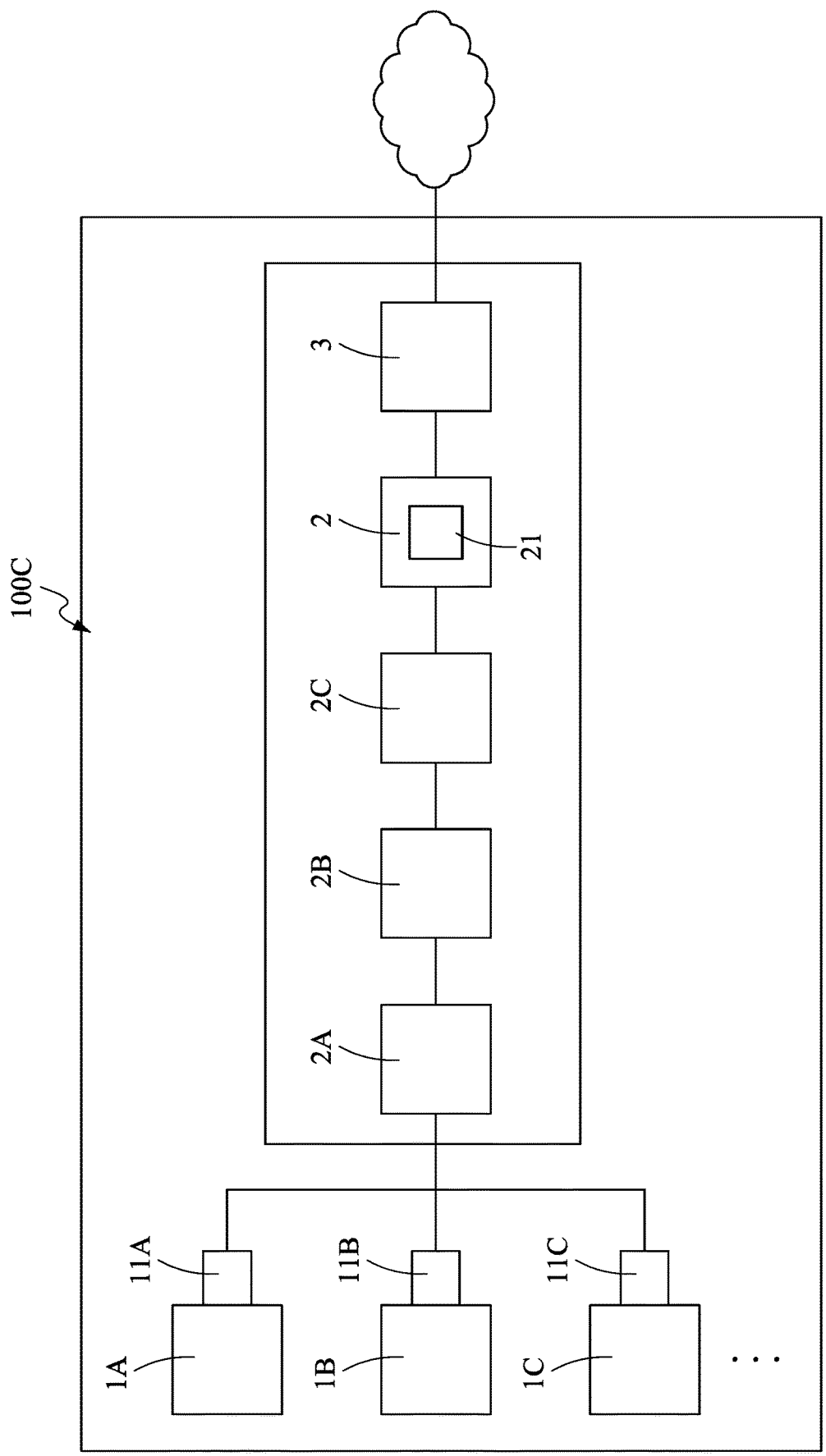
FIG. 4 is a schematic block structure diagram illustrating a network connection managing system for one or more information devices according to fourth embodiment of the present invention.

As shown in FIG. 4, a difference between a network connection managing system 100C according to fourth embodiment of the present invention and the network connection managing system 100B is that the network connection managing system 100C further comprises a list examining device 2C. The list examining device 2C is connected between the list inspecting device 2B and the network node data verifying device 2. When the list examining device 2C have received, from the list inspecting device 2B, a massage indicating that the MAC address and the network node identifying data in the information device list are not in the one-to-one-relationship-not-yet-determined status, the list examining device 2C further enables the list managing unit 21 of the network node data verifying device 2 to confirm whether the MAC address and the network node identifying data in the information device list are configured to be the one-to-one-relationship-unnecessary status. When the network connection managing system 100C confirms that the MAC address and the network node identifying data in the information device list are in the one-to-one-relationship-unnecessary status, the list examining device 2C transmits the current received MAC address and the current received network node identifying data to the network node data verifying device 2 such that the network node data verifying device 2 abandons the current received MAC address and the current received network node identifying data, or terminates the operation of comparing data including the current received MAC address and the current received network node identifying data with data including the MAC address and the network node identifying data in the information device list. On the contrary, when the network connection managing system 100C confirms that the MAC address and the network node identifying data in the information device list are not in the one-to-one-relationship-unnecessary status, the list examining device 2C transmits the current received MAC address and the current received network node identifying data to the network node data verifying device 2 so as to perform the operation of comparing data including the current received MAC address and the current received network node identifying data with data including the MAC address and the network node identifying data in the information device list.

In detail, in the network connection managing system (100, 100A, 100B, 100C) for one or more information devices according to the present invention mentioned above, the network node identifying data includes: a computer name and/or a hardware fingerprint value, i.e. the computer name of each information device (1A, 1B, 1C) and/or the hardware fingerprint value of each information device (1A, 1B, 1C). The hardware fingerprint value is generated by hashing a UUID (universally unique identifier) code of the information device (1A, 1B, 1C).

Furthermore, the network connection managing system (100, 100A, 100B, 100C) for one or more information devices according to the embodiment of the present invention simultaneously performs the operations of "collecting the MAC address of the information device (1A, 1B, 1C) and the network node identifying data" and "verifying the MAC address of the information device (1A, 1B, 1C) and the network node identifying data". The two procedures are described in detail as follows.

Figure 5:
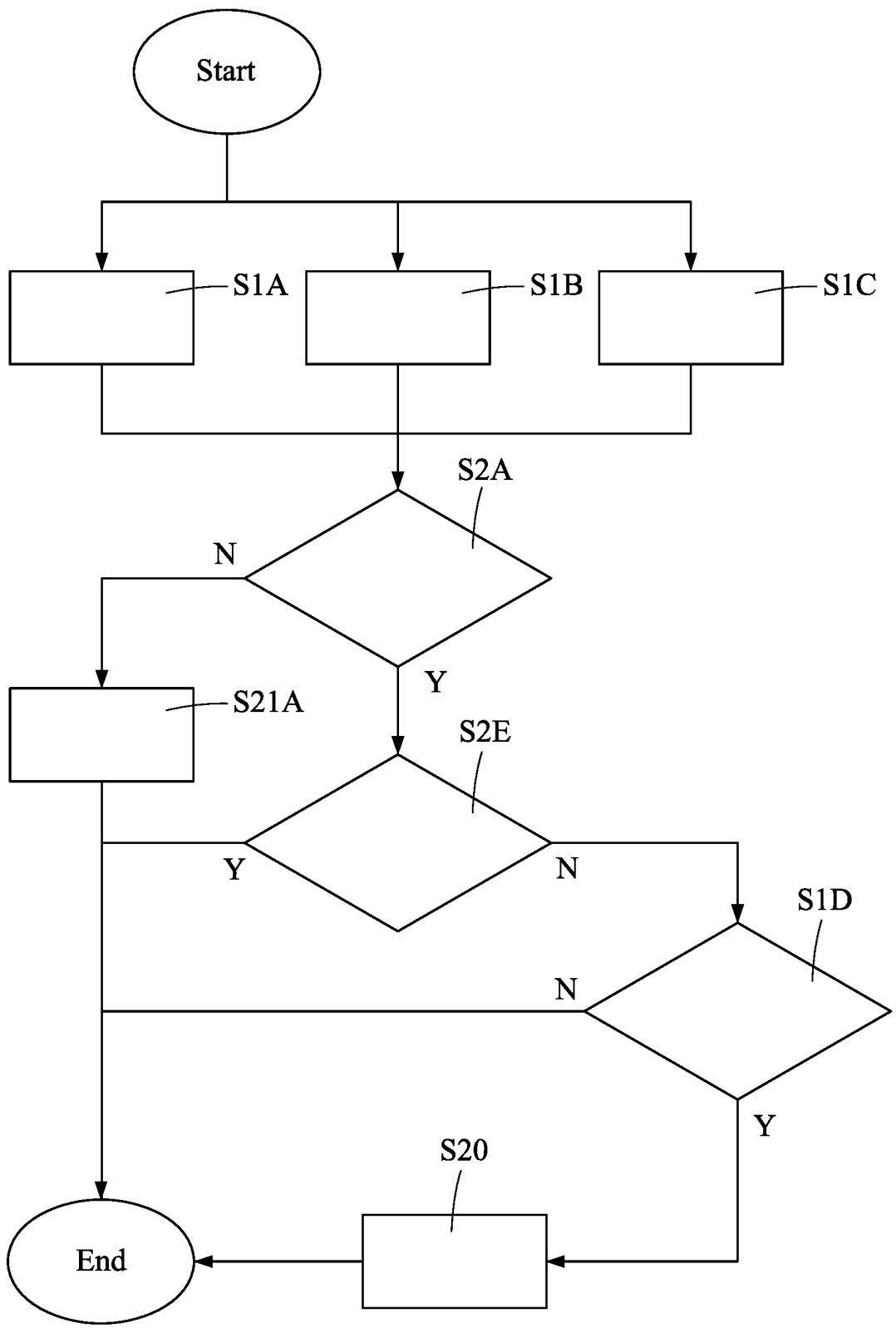
FIG. 5 is a schematic flowchart of collecting a MAC address and network node identifying data of a network node in a network connection managing system according to the present invention.

As shown in FIG. 5, the procedure of "collecting the MAC address of the information device (1A, 1B, 1C) and the network node identifying data executed by the network connection managing system (100, 100A, 100B, 100C) for one or more information devices" according to the embodiment of the present invention includes the processes listed as below.

As shown in FIG. 5, in a process S1A, the agent data reporting software reports information relating to the network node. In a process SIB, the WMI data reporting software reports information relating to the network node. In a process S1C, the network node data verifying device 2 uses the Nmap network security scanning software to scan the network node to obtain information of the network node.

As shown in FIG. 5, in a process S2A, the network connection managing system (100, 100A, 100B, 100C) determines whether the MAC address of the information device and the network node identifying data, which are currently received or obtained by scanning, have been recorded in the information device list or not by the network node data verifying device 2. Moreover, if the currently received MAC address and the currently received network node identifying data have not been recorded into the information device list, in a process S21A, the initially obtained MAC address and the initially obtained network node identifying data will be recorded into the information device list. On the contrary, if the currently received MAC address and the currently received network node identifying data have been recorded into the information device list, in a process S2E, the list inspecting device 2B and the list examining device 2C will further determine whether the current received MAC address and the current received network node identifying data in the information device list are configured to be in one-to-one-relationship status or not.

As shown in FIG. 5, as mentioned above, if the MAC address and the network node identifying data in the information device list are configured to be in one-to-one-relationship status, the network connection managing system (100, 100A, 100B, 100C) will stop the procedure of collecting the MAC address of the information device (1A, 1B, 1C) and the network node identifying data. On the contrary, if the MAC address and the network node identifying data in the information device list are not configured to be in one-to-one-relationship status, in a process SID, the network node data verifying device 2 will verify whether "the data reliability degree of the data reporting software or the network security scanning software which is used to obtain the currently received MAC address and the currently received network node identifying data" is higher than "that of the data reporting software or the network security scanning software by which the MAC address and the network node identifying data having been recorded into the information device list are obtained" or not.

As shown in FIG. 5, in the process S1D, when "the data reliability degree of the data reporting software or the network security scanning software which is used to obtain the currently received MAC address and the currently received network node identifying data" is not higher than "that of the data reporting software or the network security scanning software by which the MAC address and the network node identifying data have been recorded into the information device list are obtained", the agent data reporting software and the WMI data reporting software continue querying the network node, or the Nmap network security scanning software continues scanning the network node so as to obtain the MAC address of the network node and the network node identifying data.

On the contrary, as shown in FIG. 5, if "the data reliability degree of the data reporting software or the network security scanning software which is used to obtain the currently received MAC address and the currently received network node identifying data" is higher than "that of the data reporting software or the network security scanning software by which the MAC address and the network node identifying data having been recorded into the information device list are obtained", in a process S20, the list managing unit 21 will be operated to replace the MAC address and the network node identifying data which are obtained by the data reporting software or the network security scanning software having lower data reliability degree with the MAC address and the network node identifying data which are obtained by the data reporting software or the network security scanning software having higher data reliability degree. For example, the MAC address and the network node identifying data obtained by the WMI data reporting software are replaced with the MAC address and the network node identifying data obtained by the agent data reporting software; and, the MAC address and the network node identifying data obtained by the Nmap network security scanning software are replaced with the MAC address and the network node identifying data obtained by the WMI data reporting software. Moreover, the WMI data reporting software, the agent data reporting software or the Nmap network security scanning software continues collecting the MAC address of the network node and the network node identifying data.

Figure 6:
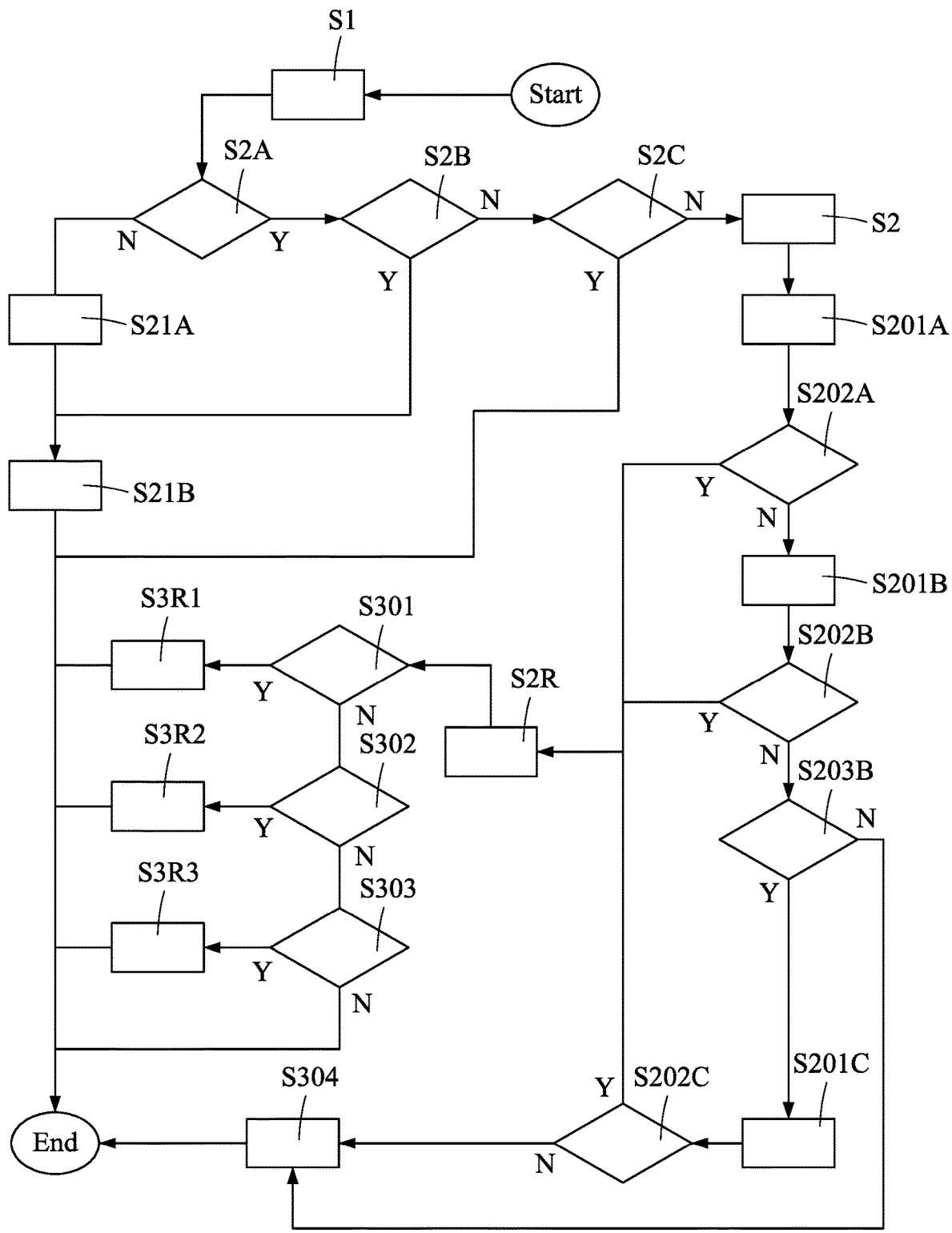
FIG. 6 is a schematic flowchart of verifying a MAC address and network node identifying data of a network node in a network connection managing system according to the present invention.

As shown in FIG. 6, the procedure of "verifying the MAC address of the information device (1A, 1B, 1C) and the network node identifying data executed by the network connection managing system (100, 100A, 100B, 100C) for one or more information devices" according to the embodiment of the present invention includes the processes listed as below.

As shown in FIG. 6, in a process S1, each information device (1A, 1B, 1C) prepares to be connected to a network.

As shown in FIG. 6, in the process S2A, the list confirming device 2A confirms whether the currently received MAC address of the information devices (1A, 1B, 1C) and the currently received network node identifying data of the information devices (1A, 1B, 1C) have been recorded in the information device list or not. If the currently received MAC address and the currently received network node identifying data have not been recorded into the information device list, in a process S21A, the initially obtained MAC address and the network node identifying data will be recorded into the information device list. On the contrary, if the currently received MAC address and the currently received network node identifying data have been recorded into the information device list, in a process S2B, the list inspecting device 2B will inspect whether the MAC address and the network node identifying data in the information device list are in a one-to-one-relationship-not-yet-determined status.

Next, as shown in FIG. 6, if the MAC address and the network node identifying data in the information device list are in the one-to-one-relationship-not-yet-determined status, in a process S21B, the MAC address and the network node identifying data in the information device list are to be configured to be any one of the following statuses including in the information device list: a one-to-one-relationship status, a one-to-one-relationship-unnecessary status, and the one-to-one-relationship-not-yet-determined status. On the contrary, if the MAC address and the network node identifying data in the information device list are not in the one-to-one-relationship-not-yet determined status, in a process S2C, the list examining device 2C will confirm whether the MAC address and the network node identifying data in the information device list are configured to be the one-to-one-relationship-unnecessary status.

As shown in FIG. 6, if the MAC address and the network node identifying data in the information device list are the one-to-one-relationship-unnecessary status, the network node data verifying device 2 will abandon the current received MAC address and the current received network node identifying data, or terminate the operation of comparing data including the current received MAC address and the current received network node identifying data with data including the MAC address and the network node identifying data in the information device list. On the contrary, if the MAC address and the network node identifying data in the information device list are not the one-to-one-relationship-unnecessary status, and then in process S2, the network node data verifying device 2 will continue verifying whether the MAC address and the network node identifying data in the information device list are in the one-to-one-relationship status.

As shown in FIG. 6, in a process S201A, the agent data reporting software queries information relating to the network node. In a process S202A, the network node data verifying device 2 verifies whether the agent data reporting software successfully queries the information relating to the network node or not. If the agent data reporting software successfully reports the information relating to the network node, in a process S2R, the data including the current received MAC address and the current received network node identifying data will be compared with the data including the MAC address and the network node identifying data in the information device list. Furthermore, when the agent data reporting software obtains the MAC address of the network node and the network node identifying data, the WMI data reporting software skips the operation of querying the MAC address and the network node identifying data, wherein the agent data reporting software is assigned with a data reliability degree higher than that of the MAC address and the network node identifying data obtained by the WMI data reporting software.

As shown in FIG. 6, if the agent data reporting software does not successfully report the information relating to the network node, in a process S201B, the WMI data reporting software will query the information relating to the network node. If the WMI data reporting software successfully reports the information relating to the network node, in a process S2R, the data including the current received MAC address and the current received network node identifying data will be compared with the data including the MAC address and the network node identifying data in the information device list. In detail, when the WMI data reporting software obtains the MAC address of the network node and the network node identifying data, the Nmap network security scanning software skips the operation of scanning the network node, wherein the WMI data reporting software is assigned with a data reliability degree higher than that of the MAC address and the network node identifying data which are obtained by the Nmap network security scanning software.

On the contrary, as shown in FIG. 6, if the WMI data reporting software does not successfully report the information relating to the network node, in a process S203B, the network node data verifying device 2 will further verify whether the MAC address and the network node identifying data in the information device list are with one-to-one-relationship status between the MAC address of the information device and the computer name in the network node identifying data or not.

As shown in FIG. 6, when the MAC address and the network node identifying data in the information device list are with one-to-one-relationship status between the MAC address of the information device and the computer name in the network node identifying data, in a process S201C, the Nmap network security scanning software of the network node data verifying device 2 scans the information relating to the network node. On the contrary, if the MAC address and the network node identifying data in the information device list are not with one-to-one-relationship status between the MAC address of the information device and the computer name in the network node identifying data, in a process S304, the comparison result indicating that the MAC address and the network node identifying data with one-to-one-relationship status cannot be verified will be generated. For example, the network node data verifying device 2 generates the comparison result to block the network connection for the network node (1A, 1B, 1C). In other words, in a condition that the agent data reporting software and the WMI data reporting software do not successfully report the information relating to the network node, when the MAC address and the network node identifying data in the information device list are not with one-to-one-relationship status between the MAC address and the computer name in the network node identifying data, the network connection managing system (100, 100A, 100B, 100C) of the present invention directly generates the comparison result indicating that the MAC address and the network node identifying data with one-to-one-relationship status cannot be verified.

In a process S202C, the network node data verifying device 2 verifies whether the Nmap network security scanning software successfully obtains the information of the network node or not. If the Nmap network security scanning software successfully obtains the information of the network node, i.e. the MAC address and the computer name in the network node identifying data, in a process S2R, the data including the current received MAC address and the current received network node identifying data will be compared with the data including the MAC address and the network node identifying data in the information device list. On the contrary, if the Nmap network security scanning software does not successfully obtain the information of the network node, in a process S304, the comparison result indicating that the MAC address and the network node identifying data with one-to-one-relationship status cannot be verified will be generated. In other words, when the Nmap network security scanning software fails to obtain the MAC address and the computer name in the network node identifying data, the MAC address of the information device (1A, 1B, 1C) and the computer name in the network node identifying data cannot be transmitted to the network node data verifying device 2 such that the network node data verifying device 2 cannot verify whether the MAC address of the information device and the network node identifying data in one-to-one-relationship status or not.

Furthermore, as shown in FIG. 6, in the process S2R, the data including the current received MAC address and the current received network node identifying data is compared with the data including the MAC address and the network node identifying data in the information device list. In other words, according to the currently received MAC address, the present invention can find out the information device which has the same MAC address as the currently received MAC address from the information device list, and then compare the currently received network node identifying data with the network node identifying data in the information device list.

Moreover, in a process S301, the present invention further confirms whether the computer name and the hardware fingerprint value in the current received network node identifying data are different from the computer name and the hardware fingerprint value in the information device list or not. When the computer name and the hardware fingerprint value in the current received network node identifying data are different from the computer name and the hardware fingerprint value in the information device list, in a process S3R1, the comparison result which indicates the computer name and the hardware finger value mismatching is generated, i.e., the network node data verifying device 2 generates the comparison result.

As shown in FIG. 6, in the process S301, if it is confirmed that the computer name and the hardware fingerprint value in the current received network node identifying data are not different from the computer name and the hardware fingerprint value in the information device list, in a process S302, it will be further confirmed whether the hardware fingerprint value in the current received network node identifying data is different from the hardware fingerprint value in the information device list or not. When the hardware fingerprint value in the current received network node identifying data is different from the hardware fingerprint value in the network node identifying data in the information device list, in a process S3R2, the comparison result indicating that the hardware fingerprint value is not matched is generated, i.e., the network node data verifying device 2 generates the comparison result.

As shown in FIG. 6, in a process S303, if it is confirmed that the computer name in the current received network node identifying data is different from the computer name in the network node identifying data in the information device list, in a process S3R3, the comparison result indicating that the computer name is not matched will be generated, i.e., the network node data verifying device 2 generates the comparison result. On the contrary, if the computer name in the current received network node identifying data is not different from the computer name in the network node identifying data in the information device list, the procedure of verifying the MAC address of the information device (1A, 1B, 1C) and the network node identifying data will be terminated.

As mentioned above, the network connection managing system (100, 100A, 100B, 100C) for the information device according to the present invention uses the network node data verifying device 2 to receive the information transmitted from the agent data reporting software and/or the WMI data reporting software or the information obtained by scanning the network node via the Nmap network security scanning software to obtain the MAC address of each information device (1A, 1B, 1C) and the network node identifying data. The network connection managing system (100, 100A, 100B, 100C) compares the currently received MAC address and the currently received network node identifying data with the MAC address and the network node identifying data in the information device list, and when the comparison result is not matched, the network node connection managing device 3 blocks the network connection for the network node. Therefore, the present invention ensures that the mobile network card (11A, 11B, 11C) and the information device (1A, 1B, 1C) are with one-to-one-relationship status thereby preventing the mobile network card (11A, 11B, 11C) to be unplugged from one information device (1A, 1B, 1C) and plugged into another information device (1A, 1B, 1C).

Moreover, the network connection managing system (100, 100A, 100B, 100C) compares the currently received MAC address and the computer name and/or the hardware finger value in the currently received network node identifying data with the MAC address and the computer name and/or the hardware finger value in the network node identifying data in the information device list. When the computer name and the hardware finger value are not matched, the hardware finger value is not matched, or the computer name is not matched, the comparison result is generated to block the network connection for the network node. Thus, the present invention can prevent the MAC address of the mobile network card (11A, 11B, 11C) from being fraudulently used so as to prevent that someone who intends to evade control of the network connection managing system from connecting other unrestrained information device to the network by the fraudulently used MAC address.

The above description is merely the explanation of the preferred embodiment of the present invention. The ordinary person skilled in the art can apply other adjustments according to the claims below and the above description. However, the adjustments still belong to the technical concept of the present invention and fall into the claims of the present invention.

What is claimed is:

1. A network connection managing system, comprising:
one or more information devices, each of which is a network node, each network node being installed with a data reporting software including agent data reporting software and WMI (windows management instrumentation) data reporting software, wherein the agent data reporting software reports information relating to the network node no matter whether the network node is installed with a Windows operating system or not, wherein the WMI data reporting software reports, when the network node is connected to a network and is installed with the Windows operating system, information relating to the network node, wherein each network node is installed with a mobile network card such that the data reporting software transmits a MAC (media access control) address of the mobile network card and network node identifying data of the network node to a network node data verification device, and wherein the MAC address and the network node identifying data obtained by the agent data reporting software is assigned with a data reliability degree higher than that of the MAC address and the network node identifying data obtained by the WMI data reporting software;

the network node data verifying device having a list managing unit, the network node data verifying device being in signal-connection with the mobile network card to receive, from the data reporting software of the network node, the MAC address and the network node identifying data obtained by the data reporting software of the network node, and/or the network node data verifying device being configured to use a network security scanning software to scan the network node such that the network node identifying data and the MAC address of the network node are obtained, thereby recording the initially obtained network node identifying data and the MAC address into an information device list, wherein the network security scanning software is a network security scan tool used for scanning network and exploring network hosts, wherein the MAC address and the network node identifying data which are obtained by the WMI data reporting software is assigned with a data reliability degree higher than that of the MAC address and the network node identifying data which are obtained by the network security scanning software, wherein the list managing unit is operated to replace the MAC address and the network node identifying data having lower data reliability degree with the MAC address and the network node identifying data having higher data reliability degree, and wherein the network node data verifying device compares a currently received MAC address and currently received network node identifying data with the MAC address and the network node identifying data in the information device list to generate a comparison result; and a network node connection managing device, connected to the network node data verifying device, wherein according to the comparison result, the network node connection managing device blocks a network connection for the network node when the comparison result indicates a mismatching result, wherein the MAC address and the network node identifying data are with one-to-one-relationship status in the information device list to prevent a network connection for the network node that fraudulently uses the MAC address to request the network connection, and wherein the network node connection managing device allows the network connection for the network node when the comparison result is a matching result.

2. The network connection managing system as claimed in claim 1, wherein during the process that the list managing unit collects the MAC address of the information device and the network node identifying data by replacing the MAC address and the network node identifying data having the lower data reliability degree with the MAC address and the network node identifying data having the higher data reliability degree, and wherein the agent data reporting software or the WMI data reporting software continues querying the network node, or the network security scanning software continues scanning the network node to obtain the MAC address and the network node identifying data, and during the process that the network node data verifying device compares the currently received MAC address and the currently received network node identifying data with the MAC address and the network node identifying data in the information device list to verify the MAC address of the information device and the network node identifying data, when the agent data reporting software has obtained the MAC address and the network node identifying data, the WMI data reporting software skips the operation of querying the MAC address and the network node identifying data, and when the WMI data reporting software has obtained the MAC address and the network node identifying data, the network security scanning software skips the operation of scanning the network node.

3. The network connection managing system as claimed in claim 1, further comprising a list confirming device, wherein the list confirming device is connected to one or more information devices and the network node data verifying device, wherein the list confirming device confirms whether the currently received MAC address and the currently received network node identifying data have been recorded in the information device list or not by comparing the currently received MAC address to be verified and the currently received network node identifying data to be verified with the MAC address and the network node identifying data in the information device list such that when it is confirmed that the currently received MAC address and the currently received network node identifying data have not been recorded into the information device list, and wherein the currently received MAC address and the currently received network node identifying data are transmitted to the list managing unit of the network node data verifying device so as to record the initially obtained MAC address and the network node identifying data into the information device list.

4. The network connection managing system as claimed in claim 3, further comprising a list inspecting device, connected between the list confirming device and the network node data verifying device, wherein when the list inspecting device receives, from the list confirming device, a massage indicating the current received MAC address and the current received network node identifying data having been recorded into the information device list, the list inspecting device further inspects, from the list managing unit of the network node data verifying device, whether the current received MAC address and the current received network node identifying data in the information device list are in a one-to-one-relationship-not-yet-determined status, and wherein when the network connection managing system confirms that the MAC address and the network node identifying data in the information device list are in a one-to-one-relationship-not-yet-determined status, the MAC address and the network node identifying data in the information device list are to be configured to be any one of the following statuses including in the information device list: a one-to-one-relationship status, a one-to-one-relationship-unnecessary status, and the one-to-one-relationship-not-yet-determined status.

5. The network connection managing system as claimed in claim 4, further comprising a list examining device, connected between the list inspecting device and the network node data verifying device, wherein when the list examining device have received, from the list inspecting device, a massage indicating that the MAC address and the network node identifying data in the information device list are not in the one-to-one-relationship-not-yet-determined status, the list examining device further enables the list managing unit of the network node data verifying device to confirm whether the MAC address and the network node identifying data in the information device list are configured to be the one-to-one-relationship-unnecessary status, wherein when the network connection managing system confirms that the MAC address and the network node identifying data in the information device list are in the one-to-one-relationship-unnecessary status, the list examining device transmits the current received MAC address and the current received network node identifying data to the network node data verifying device such that the network node data verifying device abandons the current received MAC address and the current received network node identifying data, or terminates the operation of comparing data including the current received MAC address and the current received network node identifying data with data including the MAC address and the network node identifying data in the information device list, and wherein when the network connection managing system confirms that the MAC address and the network node identifying data in the information device list are not in the one-to-one-relationship-unnecessary status, the list examining device transmits the current received MAC address and the current received network node identifying data to the network node data verifying device so as to perform the operation of comparing data including the current received MAC address and the current received network node identifying data with data including the MAC address and the network node identifying data in the information device list.

6. The network connection managing system as claimed in claim 1, wherein the network node identifying data includes: a computer name and/or a hardware fingerprint value, and the hardware fingerprint value is generated by hashing a UUID (universally unique identifier) code of the information device, wherein when a computer name in the current received network node identifying data is different from the computer name in the network node identifying data in the information device list, the network node data verifying device generates the comparison result indicating that the computer name is not matched, wherein when a hardware fingerprint value in the current received network node identifying data is different from the hardware fingerprint value in the network node identifying data in the information device list, the network node data verifying device generates the comparison result indicating that the hardware fingerprint value is not matched, and wherein when both the computer name and the hardware fingerprint value in the current received network node identifying data are different from the computer name and the hardware fingerprint value in the network node identifying data in the information device list, the network node data verifying device generates the comparison result indicating that both the computer name and the hardware fingerprint value are not matched.

7. The network connection managing system as claimed in claim 1, wherein when the data reporting software fails to obtain the MAC address and the network node identifying data to cause the MAC address and the network node identifying data unable to be transmitted to the network node data verifying device to the network node data verifying device, the network node data verifying device generates a comparison result indicating that the one-to-one-relationship status between the MAC address and the network node identifying data is unable to be verified such that the network connection for the network node is blocked.

* * * * *